United States Patent
Mohammed et al.

(10) Patent No.: US 11,691,823 B1
(45) Date of Patent: Jul. 4, 2023

(54) ADJUSTABLE CONVEYOR SYSTEM

(71) Applicant: Amazon Technologies, Inc., Seattle, WA (US)

(72) Inventors: Raashid Mohammed, Lynnwood, WA (US); Ankit Pandey, Bellevue, WA (US); Dean Christopher Fullerton, Fall City, WA (US); Kevin Shawn Lyons, Wilmington, DE (US); Terrick Willoughby, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 17/217,268

(22) Filed: Mar. 30, 2021

(51) Int. Cl.
  *B65G 41/00* (2006.01)
  *B65G 43/08* (2006.01)

(52) U.S. Cl.
  CPC .......... *B65G 41/002* (2013.01); *B65G 43/08* (2013.01); *B65G 2203/0233* (2013.01); *B65G 2203/0283* (2013.01)

(58) Field of Classification Search
  CPC ................. B65G 41/002; B65G 43/08; B65G 2203/0233; B65G 2203/0283
  USPC ...................... 198/502.3, 621.2, 621.3, 621.4
  See application file for complete search history.

(56) References Cited

U.S. PATENT DOCUMENTS

| | | | | |
|---|---|---|---|---|
| 1,186,447 A | * | 6/1916 | Launiere | B60K 15/04 52/249 |
| 5,119,906 A | * | 6/1992 | Kondratuk | B66F 7/04 187/253 |
| 8,505,710 B2 | * | 8/2013 | Egerer | B21D 43/055 198/596 |
| 10,618,752 B2 | * | 4/2020 | Heitplatz | B65G 47/5131 |

\* cited by examiner

*Primary Examiner* — Gene O Crawford
*Assistant Examiner* — Lester III Rushin
(74) *Attorney, Agent, or Firm* — Eversheds Sutherland (US) LLP

(57) ABSTRACT

Systems, methods, and computer-readable media are disclosed for systems and methods for an adjustable conveyer system. The adjustable system may include one or more conveyor systems, a support structure for a first end of the conveyor system, a support structure for the second end of the conveyor system, and a lift system. The lift system may be actuated to cause the first end of the conveyor system to raise to a height that is higher or lower than the second end of the conveyor system. The adjustable system may be used to distribute packages to containers of various heights and sizes. In one example, the lift system may include a crank shaft. In another example, the lift system may involve a pulley system.

19 Claims, 11 Drawing Sheets

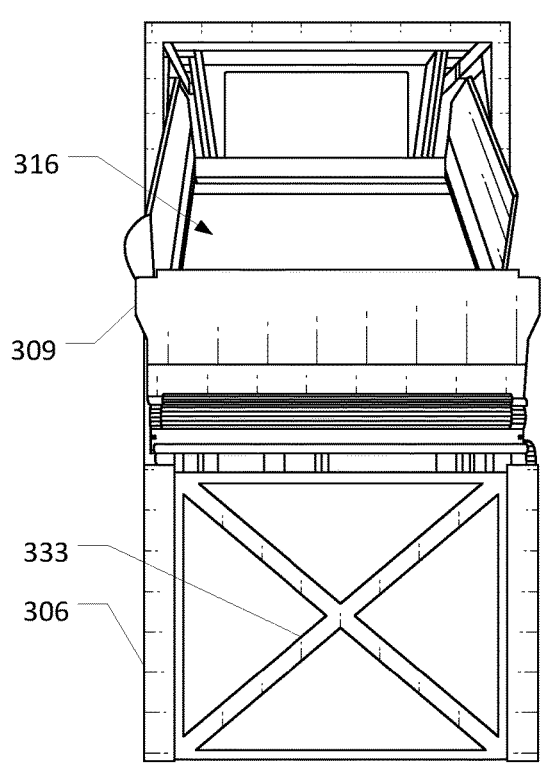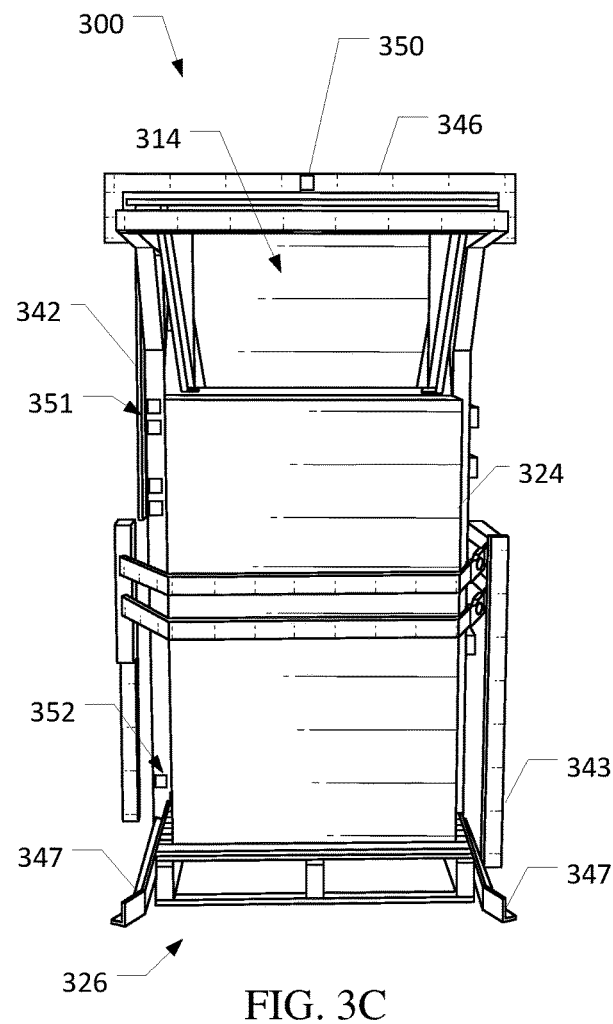
FIG. 3B
FIG. 3C

ADJUSTABLE CONVEYOR SYSTEM

BACKGROUND

Conveyor belts and systems are commonly used for distribution and manufacturing purposes. For example, conveyor belts may connect a manufacturing or staging area to a freight loading area to move both large and small items to the freight loading area for transport. Conveyor belt systems may also be used to route items to specific containers. Certain items may require shipping containers of a specific size or shape. For example, items having a long length may require larger shipping containers. The same conveyor belts and systems may be used to transport a variety of different items that may necessitate different size containers and shipping packages. As the openings of such containers and shipping packages may have differing heights with respect to the conveyor belts and systems, it is often difficult to load items into certain sized containers or shipping packages.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 3A-3C are schematic illustrations of an example use case of the adjustable system in accordance with one or more exemplary embodiments of the disclosure.

DETAILED DESCRIPTION

Overview

Figure 1:
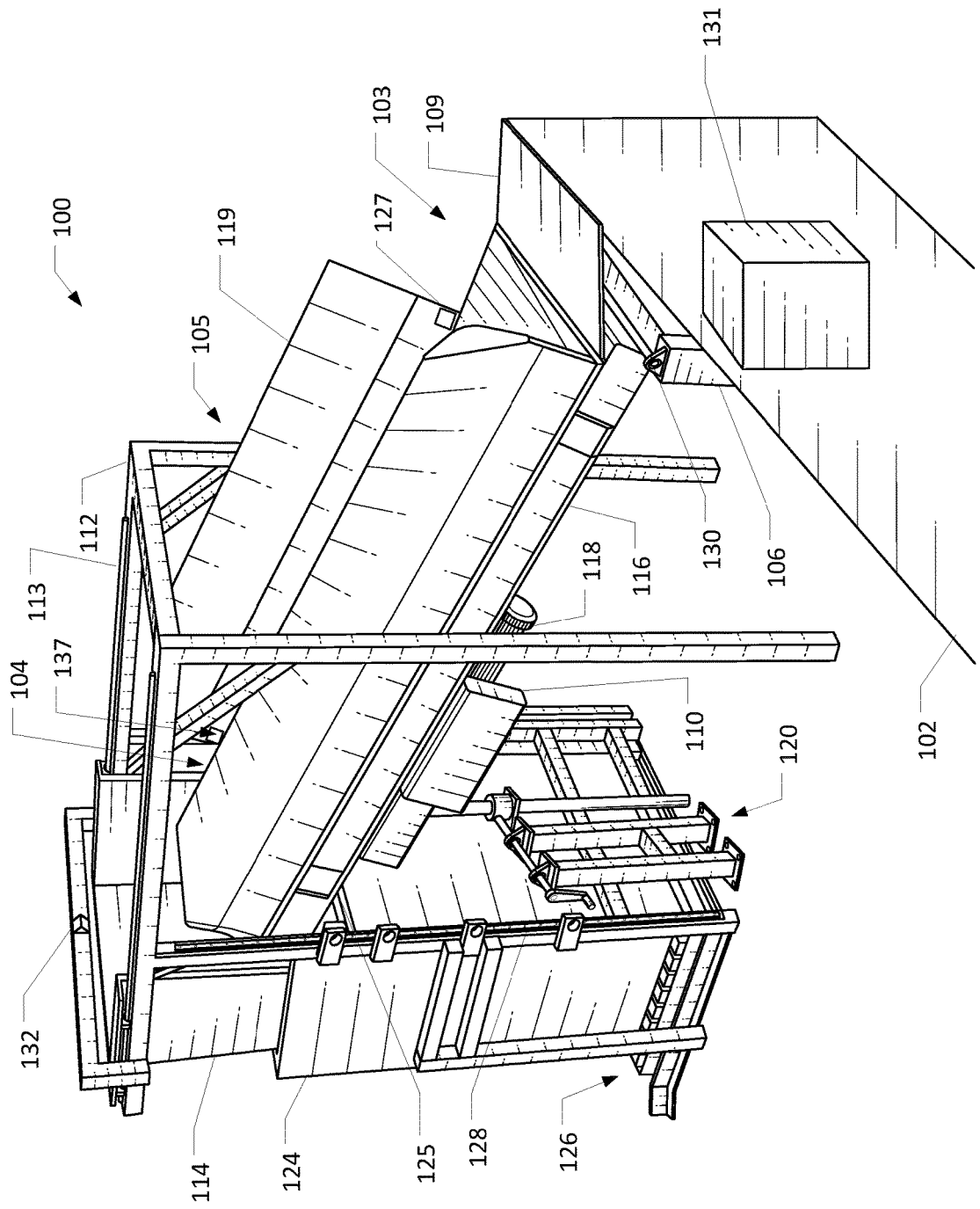
FIG. 1 is a schematic illustration of an example use case for the adjustable system in accordance with one or more exemplary embodiments of the disclosure.

An adjustable system for adjusting a conveyor system from one height to another may include a conveyor system (e.g., a conveyor belt), a first support structure to support one end of the conveyor system, a second support structure to support a second end of the conveyor system, and a lift system to transition the second end of the conveyor system from one height to another height with respect to the first end of the conveyor system.

The conveyor system may include a belt portion e.g., that is connected at its ends to form a loop and/or a series of rollers or wheels. The conveyor system may further include a computing device to control movement of the belt portion and/or rollers. The conveyor system may be used to move one or more items from a starting point of the conveyor system to an end point of the conveyor system. For example, one or more packages (e.g., boxes) may be placed on the conveyor system at the starting point of the conveyor system (e.g., the first end) and may be moved to the end point of the conveyor system (e.g., the second end). The conveyor system may move at a constant velocity in a certain direction, though it is understood that the velocity may vary, increase, and/or decrease. It is understood that the computing device may be part of or separate from the conveyor system.

The first support structure may be connected to the conveyor system at a hinged joint, such that the conveyor system at the first end has one degree of freedom along the hinged joint. The second support structure may have one or more guide rails and the conveyor system may engage the one or more guide rails such that the second end of the conveyor system may move up and down along the guide rails relative to the first end of the conveyor system. A lift system, such as a crank system, a pneumatic system, a hydraulic system, or a pulley system, or the like, may cause the second end of the conveyor system to move up and down.

The second support structure may include a structure (e.g., container, box, package, receptacle, etc.) receiving area and one or more restraints to secure a structure to the second support structure. The second support structure may further support a chute designed to guide items from the second end of the conveyor system into the structure positioned in the structure receiving area. The second support structure may further include one or more sensors (e.g., proximity sensors) for determining the presence of a support structure and/or the height of the structure. The second support structure may also include a capacity sensor disposed above the structure receiving area for determining the capacity of the structure. One or more sensors may be in communication with the computing device.

As moving items en masse typically requires depositing such items into various containers, structures, packages, etc., and each of the foregoing may involve differing heights, it may be difficult to deposit such items into the various containers, structures, packages, etc., using a single conveyor system. Indeed, traditional conveyor systems are not adjustable in height and thus must be modified or combined with a second conveyor system to modify a height at the end of the conveyor system. This can be both costly and time consuming. The adjustable system described herein may provide a single system for efficiently adjusting conveyor end height to facilitate depositing items into different structures having different heights.

Referring to FIG. 1, an example use case 100 including an adjustable system 105 for adjusting the height of a conveyor system is depicted in accordance with one or more exemplary embodiments of the disclosure. The adjustable system 105 may include conveyor system 116, support structure 106, support structure 112, lift system 120, and chute 114. The conveyor system 116 may include or communicate with computing device 110 and drive system 118. The support structure 112 may include guide 128 and structure receiving area 126. As shown in FIG. 1, container 124 may be positioned in structure receiving area 126.

In the illustrated example, the computing device 110 may communicate with drive system 118, which may include a controller and/or a motor, and may further communicate with one or more sensors (e.g., sensor 132), and other computing devices via any well-known wired or wireless system (e.g., Bluetooth, Bluetooth Low Energy (BLE), near field communication protocol, Wi-Fi, cellular network, etc.). Additionally, the computing device 110 may communicate with one or more server (e.g., remote server) via any well-known wired or wireless system.

Computing device 110 may be any computing device with a processor and may include one or more displays (e.g., touch screen display). Computing device 110 may run an application (e.g., local or cloud based application) to facilitate communication with the drive system 118, remote server, other computing device, one or more sensors, etc., and otherwise process information and/or perform operations based on data and/or information received from the foregoing. The application may be one or more applications or modules run on and/or accessed by computing device 110 (e.g., one or more modules illustrated in FIG. 10, described in more detail below). It is understood that computing device 110 may be one or more computing devices.

Conveyor system 116 may include a conveyor belt and/or one or more rollers or wheels to cause items on conveyor system 116 to move. Drive system 118 may include one or more motors and/or controllers and may control the conveyor belt and/or one or more rollers or wheels. It is understood that conveyor system 116 may be any well-known conveyor system for transferring an item from one end of the conveyor system to the other. The conveyor system 116 may be controlled by computing device 110. Alternatively, computing device 110 may be optional and conveyor system 116 may be controlled by an external computing device. It another example, the controller may be external to the drive system 118 and/or may be incorporated into computing device 110.

Conveyor system 116 may further include sensor 127 (e.g., near first end 103) which may determine the presence of one or more items (e.g., packages) on conveyor system 116. Computing device 110 may be in communication with sensor 127 and may process a signal generated by sensor 127 to determine the presence of such items and/or index or track such items. Computing device 110 may further communicate with other sensors of adjustable system 105 to determine the height of second end 104, angle of conveyor system 116 and/or the presence of structure 124 and based on this information and/or the information from sensor 127 may cause the conveyor system to activate and/or may adjust the position of adjustable lip 109.

Based on the height of the second end 104, computing device 110 may cause the adjustable lip 109 to transition upward to prevent any items determined to be present on the conveyor system 116 from falling backward. In one example, a second sensor (e.g., sensor 137) may be positioned near the second end 104 of the conveyor system 116 and may generate a signal when the item passes the second sensor and is deposited into structure 124. In this example, sensor 127 and the second sensor may be used to track the number of packages deposited into structure 127 and/or present on the conveyor system.

Adjustable system 105 may be in communication with another conveyor system (conveyor belt and/or wheels or rollers), such as conveyor system 116. Conveyor system 102 may deliver an item (e.g., item 131) to conveyor system 116 (e.g., to the first end 103 of conveyor system 116). Conveyor system 116 may include an adjustable lip 109 at the first end 103 that may transition from an up position, orthogonal to the conveyor system 116, to a down position, parallel to the conveyor system 116, and/or to any other inclined or declined position.

Adjustable lip 109 may serve as a bridge between conveyor system 102 and conveyor system 105, such that item 131 may traverse lip 109 to enter conveyor system 116. Adjustable lip 109 may transition to an up position when the conveyor system 116 is in an inclined position, to prevent any items from falling off of conveyor system 116. Conveyor system 116 may further include one or more baffles 119 to keep items on conveyor system 116. It is understood that conveyor system 116 may include sensors along conveyor system 116 to identify the presence of one or more items (e.g., packages) along conveyor system 116 (e.g., along a conveyor belt of conveyor system 116). Computing device 110 may start or stop, adjust lip 109, or otherwise control the conveyor system based on sensor information.

The first end 103 of conveyor system 116 may be supported and attached to support structure 106. Support structure 106 may be rigidly attached to a secure surface, such as the floor, and may be secured to the secured surface such that support structure 106 does not move. The support structure 106 may include joint 130 and may be attached to the conveyor system 116 at joint 130. Joint 130 may be a hinged joint and/or may have one degree of freedom about joint 130 such that conveyor system 116 may rotate around support structure 106 about joint 130. It is understood that support structure 106 may include one or more joints 130 (e.g., one attached to the two corners of second end 103. Support structure 106 may be any type of structure that may support the first end 103.

Support structure 112 may further support conveyor system 116 at the second end 104 of conveyor system 116. Support structure 112 may be any type of structure that may support the second end 104 at various heights. As shown in FIG. 1, support structure 112 may include four or more legs and may be positioned above and around the conveyor system 116. Two legs positioned near the second end 104 may include linear guides 128 to guide the second end 104 to various heights. The conveyor system 116 may connect to platform 125 that may engage with the linear guides 128 to facilitate movement of second 104 along the linear guides 128, as shown in more detail in FIG. 5.

To move second end 104 up and down along the linear guides 128 of the support structure 112, lift system 120 may be employed. Lift system 120 may include a crank shaft that may be manually engaged (e.g., turned) to cause a screw system and/or telescoping system to move up and down and thus move second end 104 up and down. The screw system of lift system 120 may be coupled to the platform 125 and may cause the platform to move up and down when the lift system 120 is engaged. It is understood that the lift system may alternatively be any other type of lift system, such as a pulley system illustrated in FIG. 8, a pneumatic air system, and/or any other well-known lift system. It is further understood that the lift system 120 may be automated and controlled by a motor and/or computing device 110. It is understood that in one example, the support structure 106, support structure 112 and/or lift system 120 may be the same.

The second end 104 may be raised to the height of an opening of structure 124 (e.g., package, container, shipping structure, and the like). As shown in FIG. 1, structure 124 (e.g., container, shipping package, cart, or the like) may be positioned in structure receiving area 126 of support structure 112. Support structure 112 may further support chute 114 which may guide items from the second end 104 of the conveyor system 116 to structure 124 to prevent items from falling to the ground. Chute 114 may engage with linear guides 113 which may extend along upper rails of the support structure 114. As second end 104 moves up and down, chute 114 may move along linear guides 113 such that chute 114 is properly positioned to guide items into structure 124 or any other structure.

Chute 114 may be a three walled structure or any other design that guides items into container 124 and engages with linear guides 113. Sensor 132 may be positioned above structure 124 and may determine the capacity of structure 124 (e.g., whether structure 124 is full or has more room for items). Sensor 132 may be any type of well-known sensor (e.g., proximity sensor, optical sensor) that is designed to generate a signal corresponding to an obstruction of structure 124. Support structure 112 may include additional sensors to determine the presence of structure 124 and/or the size, type or height of structure 124.

Illustrative Process and Use Cases

Figure 2A:
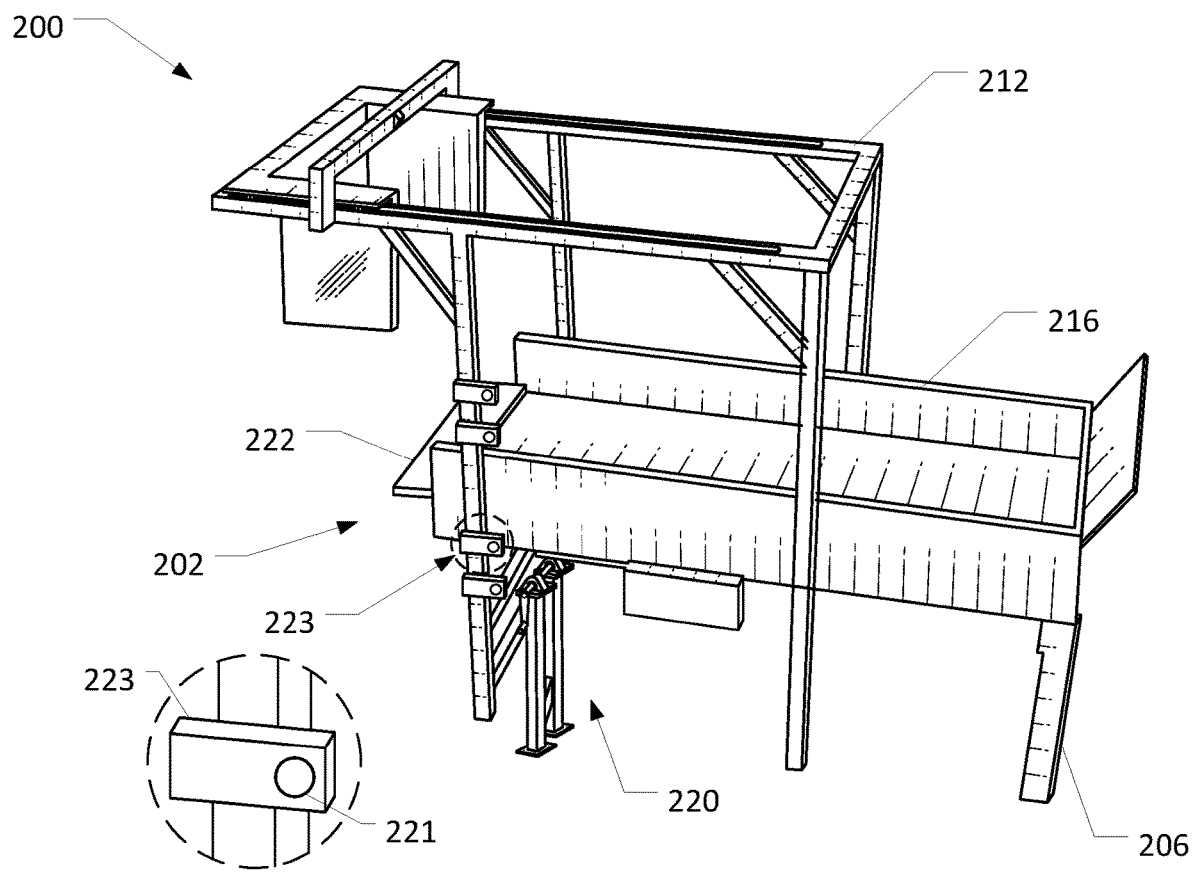
FIGS. 2A-2B are schematic illustrations of example use cases for the adjustable system in horizontal and inclined positions in accordance with one or more exemplary embodiments of the disclosure.
Figure 2B:
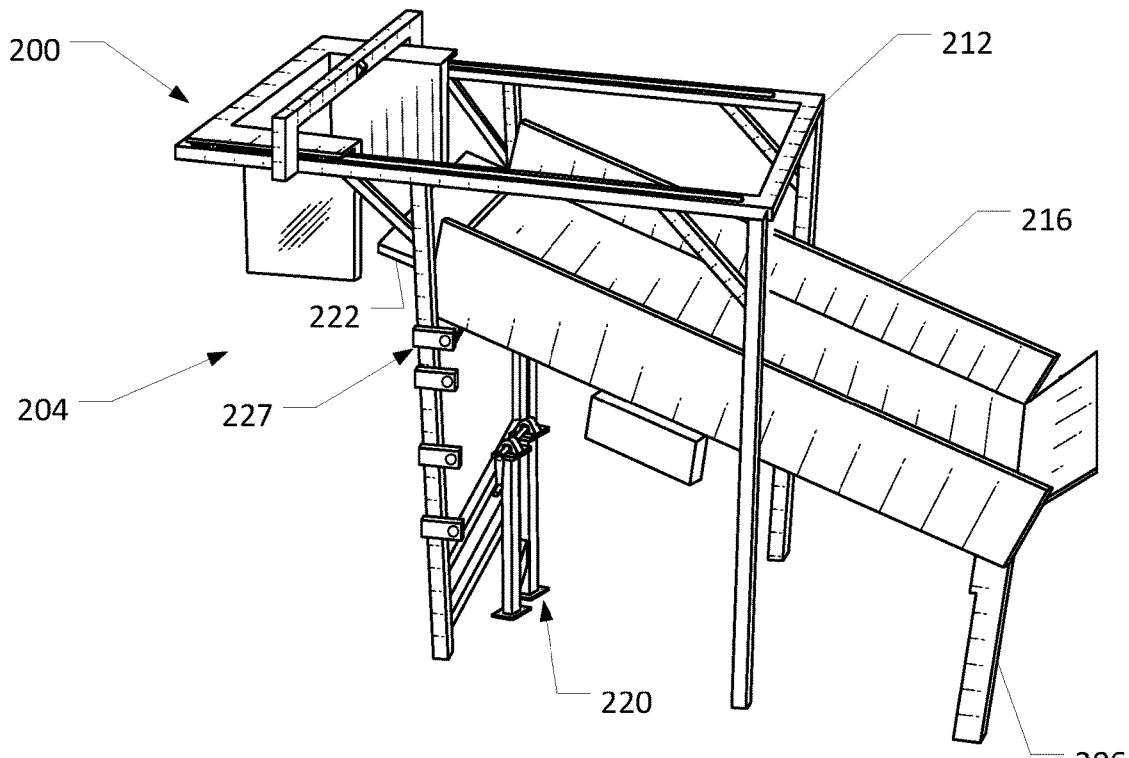

Referring to FIGS. 2A-2B, adjustable system 200 is illustrated in both horizontal and inclined positions in accordance with one or more exemplary embodiments of the disclosure. Adjustable system 200 may be the same as adjustable system 105. Specifically, adjustable system 200 may include conveyor system 216, which may be the same as conveyor system 116, support structure 206, which may be the same as support structure 106, support structure 212, which may be the same as support structure 112, and lift system 220, which may be the same as lift system 120.

As shown in FIG. 2A, adjustable system 200 has been adjusted to assume a horizontal position 202. Lift system 220 may be used to transition conveyor system 216 to the horizontal position. To secure conveyor system 216 in the horizontal position, one or more restraints 223 may be engaged with conveyor system 216. In one example, conveyor system may include several restraints 223 on the legs of support structure 212 (e.g., near the linear guides). For example, restraint 223 may include a keyhole 221 that may align with a keyhole affixed or otherwise coupled to conveyor system 216 and/or platform. A pin or other protrusion may traverse keyhole 221 to lock the conveyor system 216 into place with respect to the support structure 212. It is understood, however, that any other well-known restraint system may be employed.

As shown in FIG. 2B, adjustable system 200 is illustrated in an inclined position 204. To transition the conveyor system 216 from the horizontal position 202 shown in FIG. 2A to the inclined position 204, lift system 220 may be employed. To secure the conveyor system 216 to the support structure 212, restraint 227 may be engaged (e.g., using a pin), which may be the same as restraint 223, except restraint 227 may be positioned at a higher location. It is understood that several restraints may be strategically located with respect to conveyor system 216 to align with the height of various structures positioned in the structure receiving area.

Figure 3A:
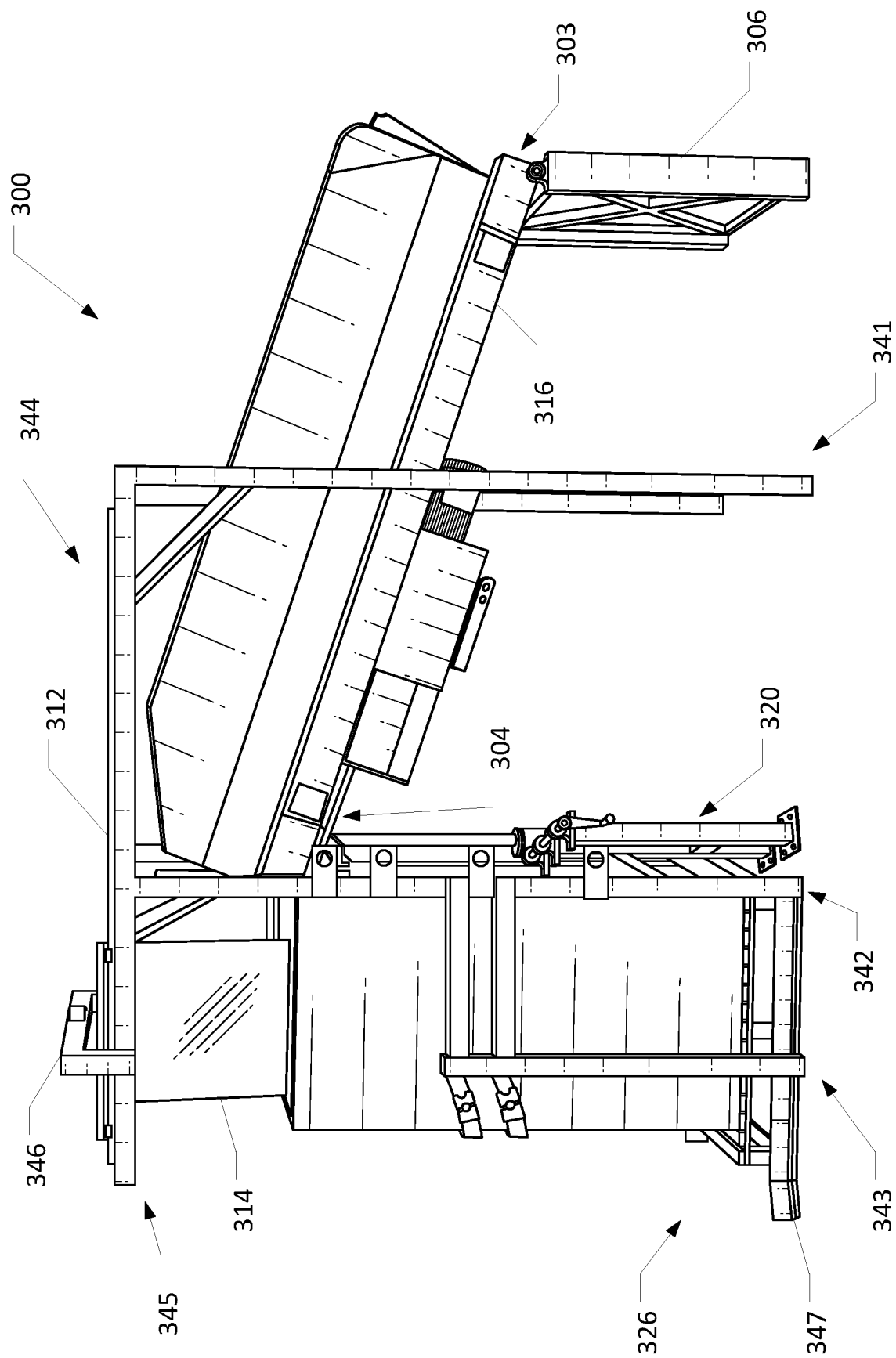

Referring now to FIGS. 3A-3C, adjustable system 300 is illustrated from side, front, and back perspectives in accordance with one or more exemplary embodiments of the disclosure. Adjustable system 400 may be the same as adjustable system 105. Specifically, adjustable system 300 may include conveyor system 316, which may be the same as conveyor system 116, support structure 306, which may be the same as support structure 106, support structure 312, which may be the same as support structure 112, chute 314, which may be the same as chute 114, and lift system 320, which may be the same as lift system 120.

Referring now to FIG. 3A, a side view of the adjustable system 300 is illustrated in an inclined position. As is shown in FIG. 3A, support structure 306 may support first end 303 of conveyor system 316 and support structure 312 may support the second end 304 of conveyor system 316. Support structure 312 may involve a rectangular support system including legs 341, legs 342, and legs 343, which each may include pairs of legs. Additionally, cross beams 344 may connect legs 341 and legs 342. Further, cross beam 346 may connect cross beams 344. This generally rectangular structure provides rigidity to the adjustable system 300.

Legs 343 and legs 342, together with guide 347 which may be coupled to les 343 and/or legs 342, may define structure receiving area 326, which may be the same as structure receiving area 126. Guide 347 may be adjacent to the secure surface and may help guide a structure (e.g., container, package, shipping structure) or a pallet supporting a structure to the structure receiving area 326. It is understood that the support structure 312 may be affixed to a secured surface (e.g., floor) at legs 341, legs 342, and/or legs 343. It is further understood that support structure 312 may take any other shape or design that performs the functions described herein.

Referring now to FIG. 3B, a front view of the adjustable system 300 is illustrated in an inclined position. As shown in FIG. 3B, support structure 306 may have a generally rectangular shape. In one example, support structure 306 may include crossbeam 333 to improve rigidity and overall strength. It is understood that the support structure 306 may be affixed to a secured surface (e.g., the floor). It is further understood that support structure 306 may take any other shape or design that performs the functions described herein. As is also shown in FIG. 3B, lip 309, which may be the same as lip 109, may be configured in the upright position to prevent items from falling down conveyor system 316 in the inclined position.

Referring now to FIG. 3C, a back view of the adjustable system 300 is illustrated. As shown in FIG. 3C, chute 314 may serve as backstop for the conveyor system such that any items exiting the second end of the conveyor system are guided into structure 324, which may be the same as structure 124. As is also shown in FIG. 3C, guides 347 may guide structure 324 into structure receiving area 326. In one example, guides 347 may be attached to legs 343 and/or legs 342.

As is also shown in FIG. 3C, sensors 350, sensors 351 and, sensors 352 may be one or more sensors (e.g., proximity sensor, optical sensor, etc.) positioned about support structure 312. It is understood that sensor 350 may be positioned on cross bar 346 and may be any type of sensor (e.g., optical sensor) that is designed to generate a signal corresponding to an obstruction and/or a depth of an obstruction. Sensor 350 may be positioned above the structure receiving area 326. Specifically, sensor 350 may be one or more sensors designed to determine whether structure 324 has any capacity. In one example, computing device based on data from sensor 350 may determine a depth or distance to an obstruction and based on this information may generate a signal that indicates a depth or distance value.

Sensor 351 may be one or more sensors used to determine a height value corresponding to structure 124. As various structures with differing height may be positioned into structure receiving area 326, sensors 351 may be used to determine what type of structure has is in structure receiving area 326. In one example, sensors 351 may be positioned at various heights of frequently used structures. Adjustable system 300 may further include sensor 352 which may be positioned near structure receiving area 326 and may generate a signal to indicate that a structure and/or pallet or any other object is situated in structure receiving area 326.

The computing device of the conveyor system may process the signals generated by sensors 350, 351, and/or 352. In one example, sensor 350 may be used by the computing device to stop the conveyor system if the structure 324 is at capacity. In another example, the lift system may be automated and the height of the conveyor system 316 may be adjusted based on the detected structure height according to sensor 351. It is understood that this sensor information may be shared with other computing devices, e.g., remote devices. For example, the sensors may alert a remote computing device that the structure 324 is at capacity.

Figure 4:
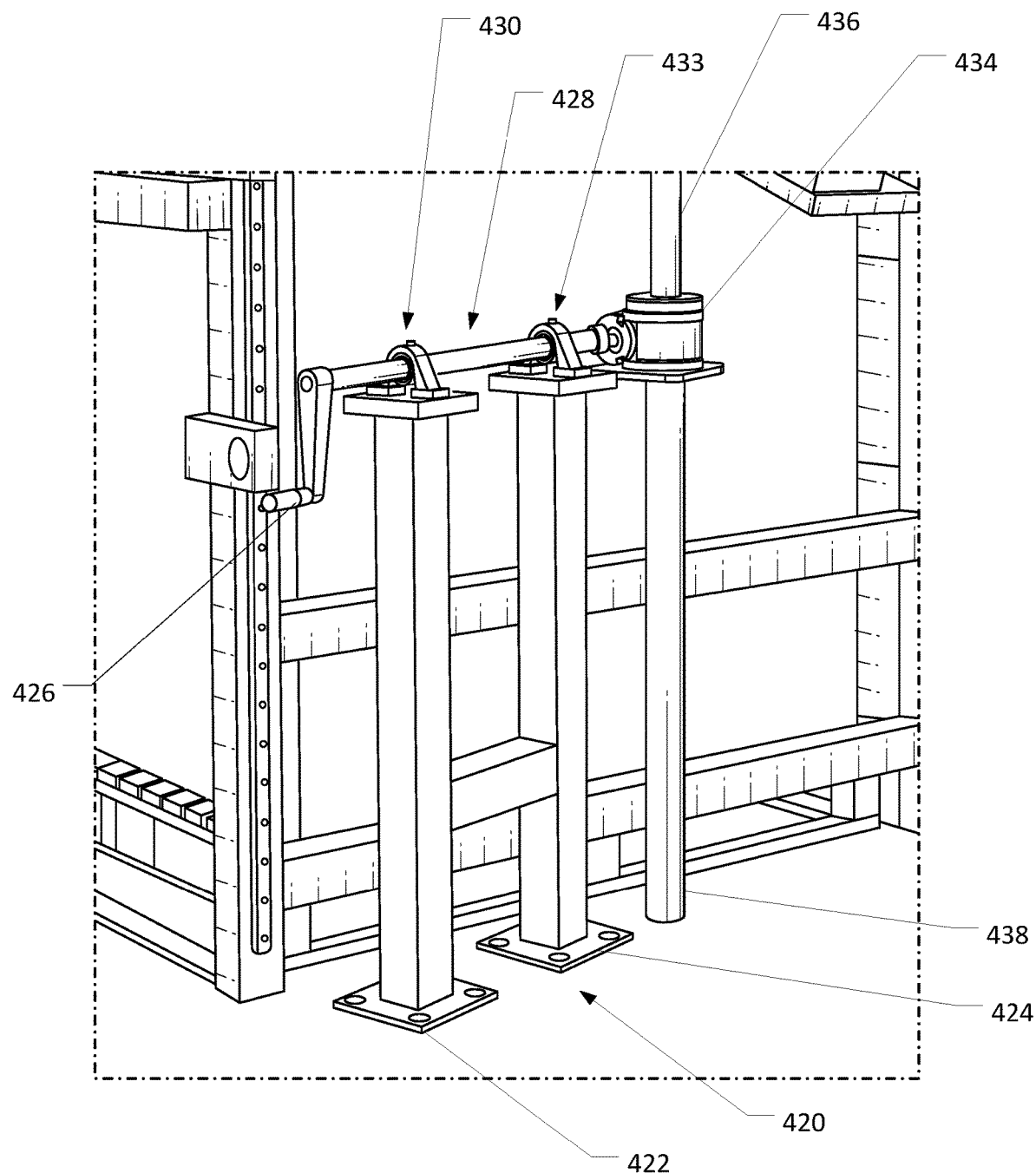
FIG. 4 is a schematic illustration of an example use case of a lift system of the adjustable system in accordance with one or more exemplary embodiments of the disclosure.
Figure 8:
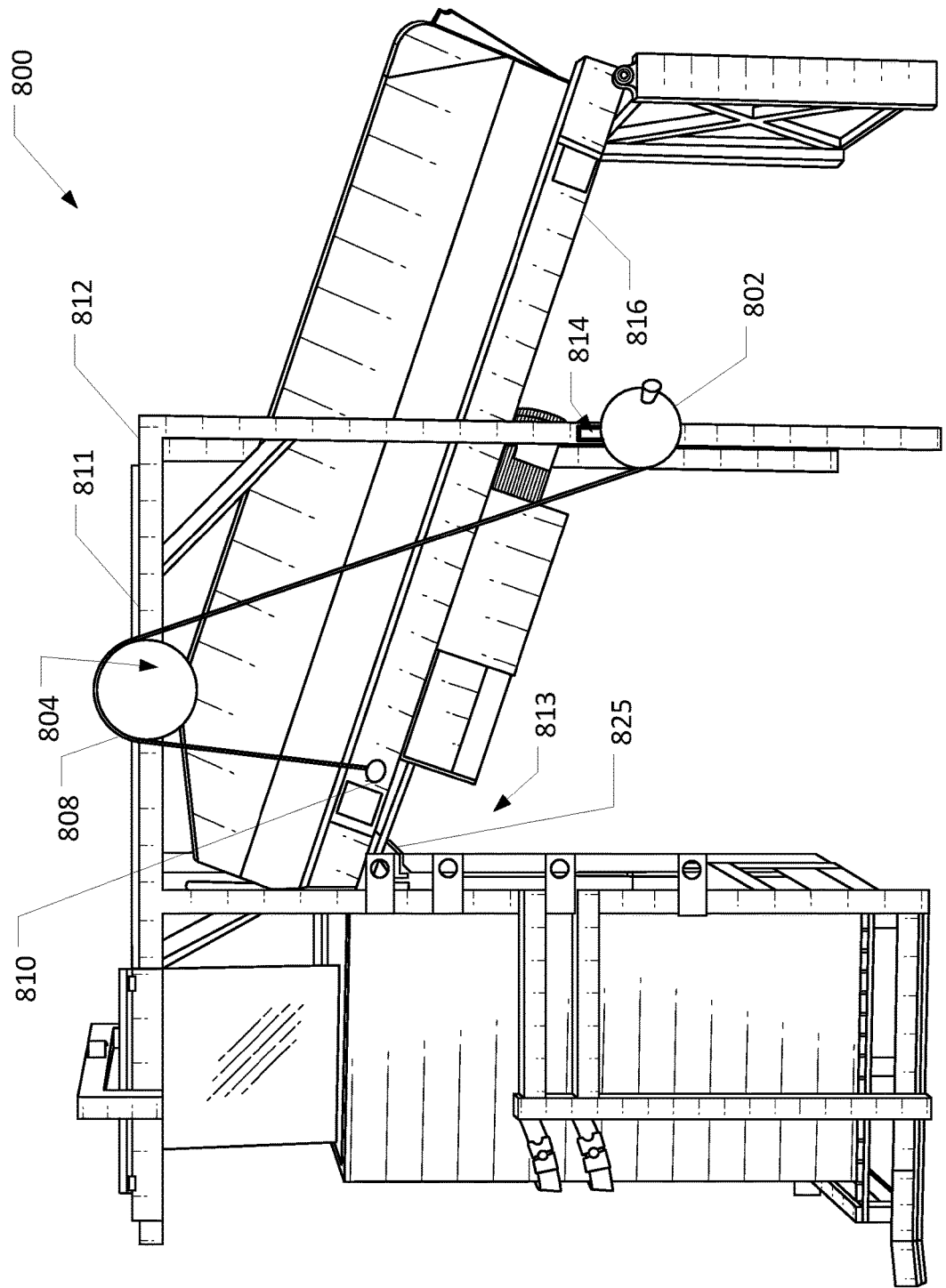
FIG. 8 is a schematic illustration of an example use case of a pulley lift system of the adjustable system in accordance with one or more exemplary embodiments of the disclosure.

Referring now to FIG. 4, lift system 420 of the adjustable system is illustrated in accordance with one or more exemplary embodiments of the disclosure. It is understood that lift system 420 is exemplary and that any other type of well-known lift system may be employed by the adjustable system to raise and lower the second end of the conveyor system. For example, FIG. 8 illustrates an alternative lift system that does not use a crank shaft. It is further understood that other systems, such as a pneumatic system may be employed.

As shown in FIG. 4, lift system 420 may be a crank shaft system including hand crank 426, crank shaft 428 and lift shaft 436. Hand crank may be any well-known type of hand crank that may be manually turned by a user to raise and lower lift shaft 436. Hand crank may be rigidly attached to crank shaft 428. For example, one revolution of hand crank 426 may result in one revolution of crank shaft 428. Crank shaft 428 may traverse bearing 430 and/or bearing 433. Bearing 430 and/or bearing 433 may be radial bearings that permit crank shaft 428 to rotate about its primary axis.

Bearing 430 may be supported by support structure 422, which may extend to a secure surface. Similarly, bearing 433 may be supported by support structure 424, which may also extend to the secure surface. It is understood that bearing 430 or bearing 433 may be optional. Crank shaft 428 may be threaded at a distal end, which may extend into differential 434. Differential 434 may further receive a threaded end of lift shaft 436. At differential 434, the threaded end of lift shaft 436 may be engaged with the threaded end of crank shaft 428 and rotation of the crank shaft 428 may result in rotation of the lift shaft 436.

Lift shaft 436 may be telescoping and/or may extend and retract based on the direction of rotation of the lift shaft. A user thus may turn hand crank 426 to cause lift shaft 436 to rotate in a direction that causes lift shaft 436 to telescope or extend upwards, thereby extending the length of lift shaft 436. Lift shaft 436 may be fixed at one end to the platform supporting the second end of the conveyor system, and thus as lift shaft 436 extends, the second end of the conveyor system rises. Conversely, when the lift shaft telescopes inwardly, the second end of the conveyor system lowers.

Figure 5:
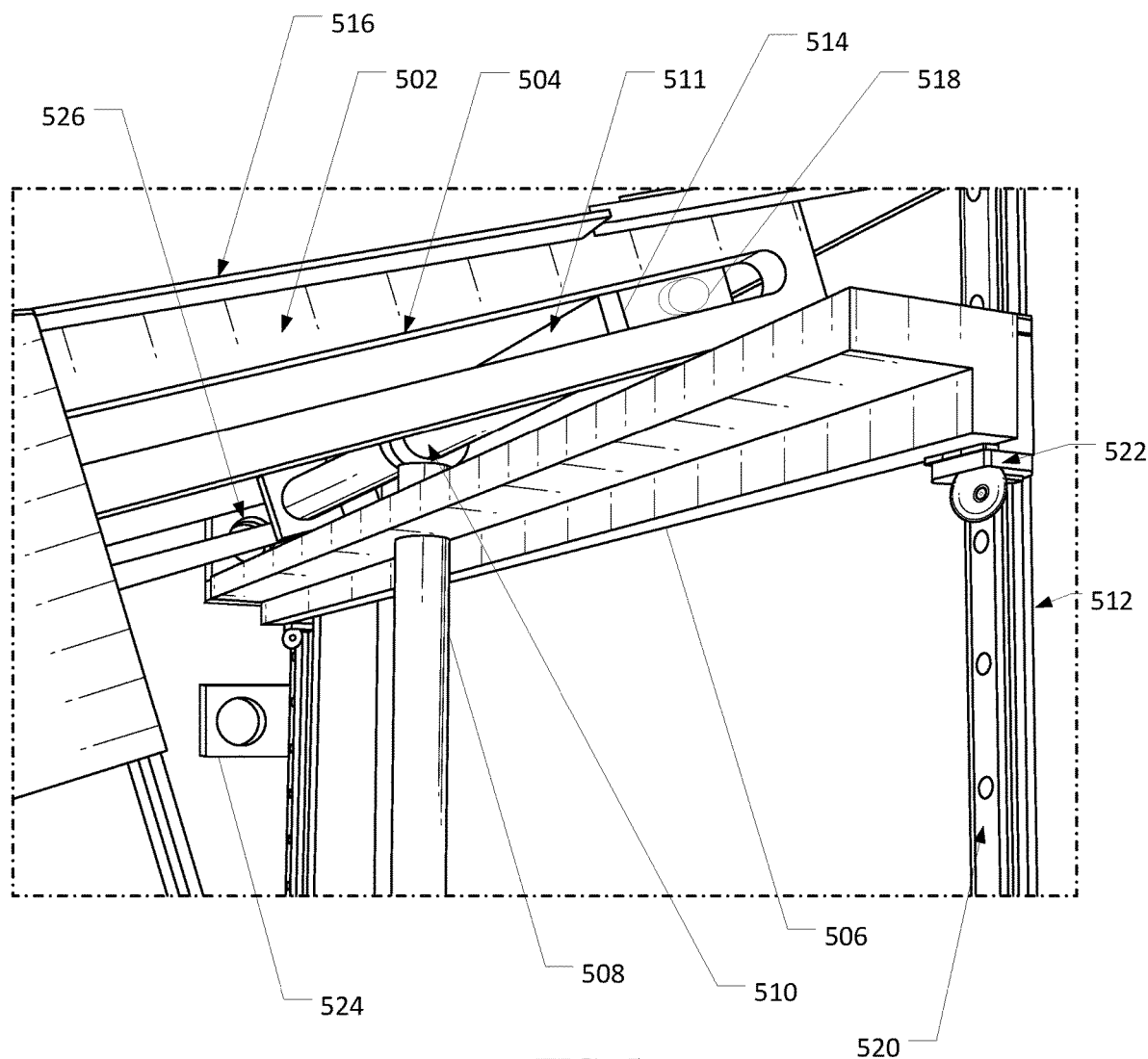
FIG. 5 is a schematic illustration of an example use case of a platform and lift system of the adjustable system in accordance with one or more exemplary embodiments of the disclosure.

Referring now to FIG. 5, the platform 506 and the lift shaft 508 of the adjustable system are illustrated in accordance with one or more exemplary embodiments of the disclosure. As shown in FIG. 5, lift shaft 508, which may be the same as lift shaft 436, may be rigidly connected to platform 506. Platform 506 may further include at either end, rail carriage 522, which may be engaged with linear rails 520. Linear rails 520 may be fixed to support structure 512, which may be the same as support structure 112. Linear rails 520 may be linear rail guides or linear motion guides which may guide platform up and down along support structure 512.

Bearing 510 may be fixed to platform 506. Bearing 510 may be one or more radial bearings that permit shaft 511 to rotate about its primary axis. Shaft 511 may terminate at both ends into guide structure 514 which may include guide protrusion 518. Guide protrusion 518 may be supported by guide structure 514 and may be a smooth and/or cylindrical structure protruding from shaft 511. In one example, guide protrusion 518 may have a diameter smaller than the diameter of shaft 511.

Guide protrusion 518 may be engaged with linear guide 502 which may be affixed to or otherwise extend from conveyor system 516, which may be the same as conveyor system 116. Linear guide 502 may include guide slot 504 which is designed to receive and engage guide protrusion 518 such that guide protrusion 518 may move along guide slot 504. In one example, guide slot 504 may be linear to facilitate linear movement of guide protrusion 518. However, it is understood that guide protrusion 518 may be non-linear.

Platform 506 may further include restraint 526 rigidly affixed to and/or extending from at least one end of platform 506. Restraint 526 may include a keyhole that is designed and orientated to extend align with one or more restraints 524 which may extend from support structure 512. Restraint 524 may be the same as restraints 223. When restraint 526 is aligned with restraint 524, platform may be locked into place with respect to support structure 512 by placing a pin or other locking device through the keyholes of restraint 526 and restraint 524. It is understood that support structure 512 may include restraints on only one leg or on both legs engaged with platform 506.

As protrusion 518 is free to move along guide slot 504 and guide slot 504 is rigidly affixed to conveyor system 516, as lift shaft 508 rises, so too does platform 506. As platform 506 rises, shaft 510 and thus guide protrusion 518 applies an upward force to the linear guide 502, thereby causing the second end of the conveyor system 516 to raise. As conveyor system 516 rises, guide protrusion 518 moves to the right along the guide slot 504. Conversely, as the platform lowers, so too does the second end of the conveyor system 516, resulting in guide protrusion moving to left with respect to the guide slot 504.

Figure 6A:
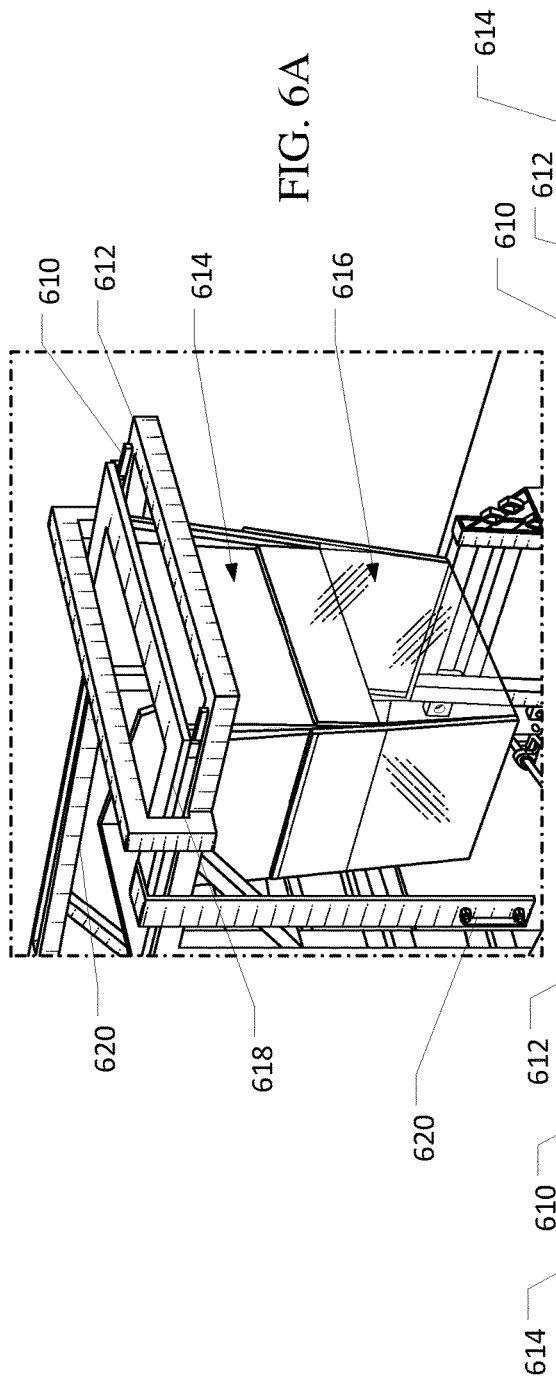
FIGS. 6A-6C are schematic illustrations of an example use case of the chute of the conveyor system in accordance with one or more exemplary embodiments of the disclosure.
Figure 6C:
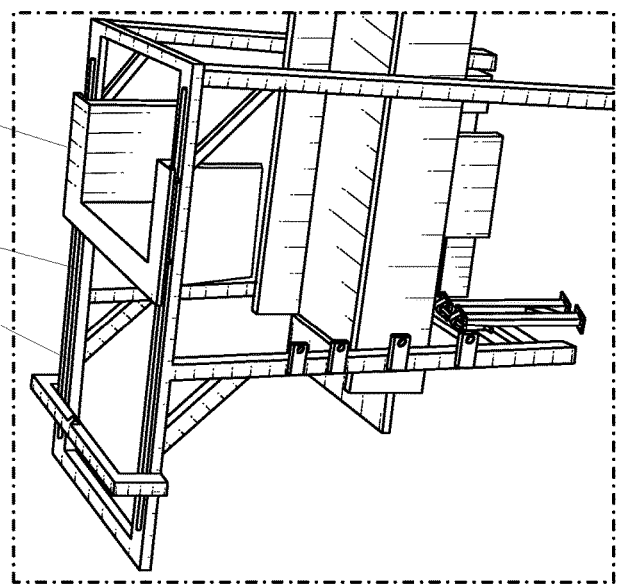
Figure 6B:
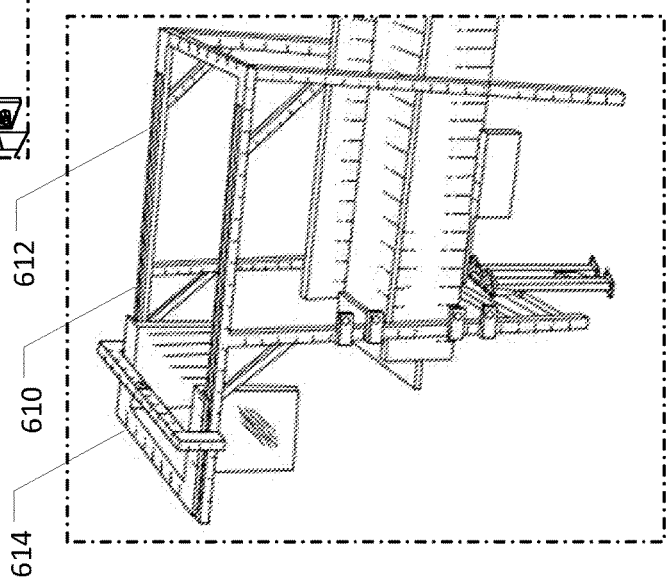

Referring now to FIGS. 6A-6C, the chute 614 of the adjustable system is illustrated in accordance with one or more exemplary embodiments of the disclosure. Chute 614 may be the same or similar to chute 114. Specifically, chute 614 may be a three-sided structure designed to guide items (e.g., packages) into the structure receiving area. As shown in FIG. 6A, chute 614 may include extender 616 which may extend the three walls of chute 614. In one example, extender 616 may be transparent. In another example, extender 616 may be extendable.

Chute 614 may further include chute lip 618 which may extend over support structure 612, which may be the same as support structure 112. Support structure 612 may include linear guide rails 610 and chute lip 618 may include bearings and/or otherwise may be designed to move along the linear guide rails 610. Chute 614 may further include handle 620, which may extend from chute lip 618 and may be used by a user to push chute 614 along linear guide rails 610.

Referring now to FIGS. 6B and 6C, chute 614 may move from left to right along linear guide rails 610 of support structure 612. As shown in FIG. 6B, the chute 114 may be placed at the left-most position when the conveyor system is raised to guide items from the raised conveyor system into the structure receiving area. Alternatively, as is shown in FIG. 6C, chute 614 may be moved to the right as the conveyor system is lowered and ultimately may be moved into a storage position to avoid interference with any structures in structure receiving area when the conveyor system is in the horizontal position.

Figure 7:
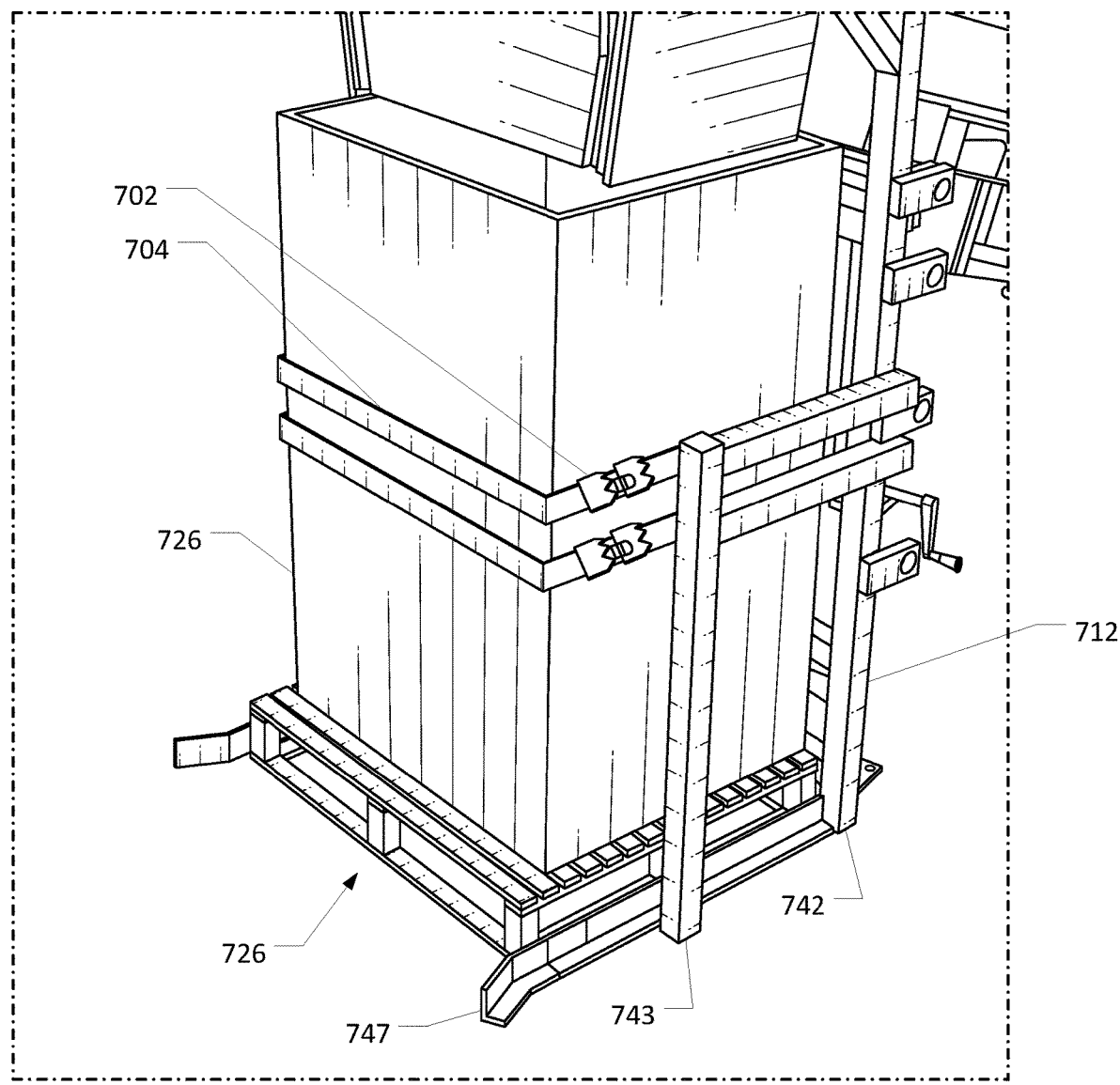
FIG. 7 is a schematic illustration of an example use case of the loading area and constraint of the adjustable system in accordance with one or more exemplary embodiments of the disclosure.

Referring now to FIG. 7, the structure receiving area and structure restraints of the adjustable system are illustrated in accordance with one or more exemplary embodiments of the disclosure. As shown in FIG. 7, structure receiving area 726 may be defined by legs 742 and legs 743, which may be the same as legs 342 and 343, respectively. Legs 742 and legs 743 may be part of support structure 712, which may be the same as support structure 112. Legs 742 and legs 743 may support guide 747, which may be the same as guide 347, and may be designed to guide a structure and/or a pallet supporting a structure into the structure receiving area 726. In one example, guides 747 may narrow as they near support structure 712.

Support structure may further include one or more restraint straps 704 and one or structure restraints 702 that are designed to restrain the structure (e.g., structure 726) to the support structure 712. In one example, restraint strap 704 may extend from legs 743 and may include structure restraint 702. Structure restraint 702 may be a buckle or any other restraint designed to be opened and closed (e.g., Velcro, buckle restraint, button restraint, threaded restraint, or any other well-known restraint). In yet another example, structure restraint 702 may be one or more rigid arms or other structures that extend from support structure 712 to secure structure 726.

Referring now to FIG. 8, an alternative lift system of the adjustable system involving a pulley is illustrated in accordance with one or more exemplary embodiments of the disclosure. As shown in FIG. 8, adjustable system 800 may be similar to adjustable system 105 but may have pulley system 804 secured to the support structure 812, which may be the same as support structure 112. For example, a pulley wheel 804 may be secured to cross member 811 of support structure 812. It is understood that multiple pulleys may be employed to manipulate the force applied to the conveyor system and/or for ergonomic purposes.

Cable 808 may be engaged with pulley wheel 804 and may be affixed at one end of the conveyor system 816, which may be the same as conveyor system 116, at restraint 810. Alternatively, cable 808 may be affixed to platform 825, which may be the same as platform 125. The other end of cable 808 may be engaged with pulley wheel 802. Pulley wheel 802 may include a handle for ease of use and may be manually turned (e.g., by a user) to collect cable 808 at pulley wheel 802, causing the second end 813 of conveyor system 816 to rise, or alternatively lower if pulley wheel 802 is rotated in the opposite direction. Pulley wheel 802 may also optionally include a locking device 814 which may resist movement of pulley wheel 802 when engaged. It is understood that pulley wheel 802 and/or pulley wheel 804 may be located at different positions and/or locations.

Figure 9:
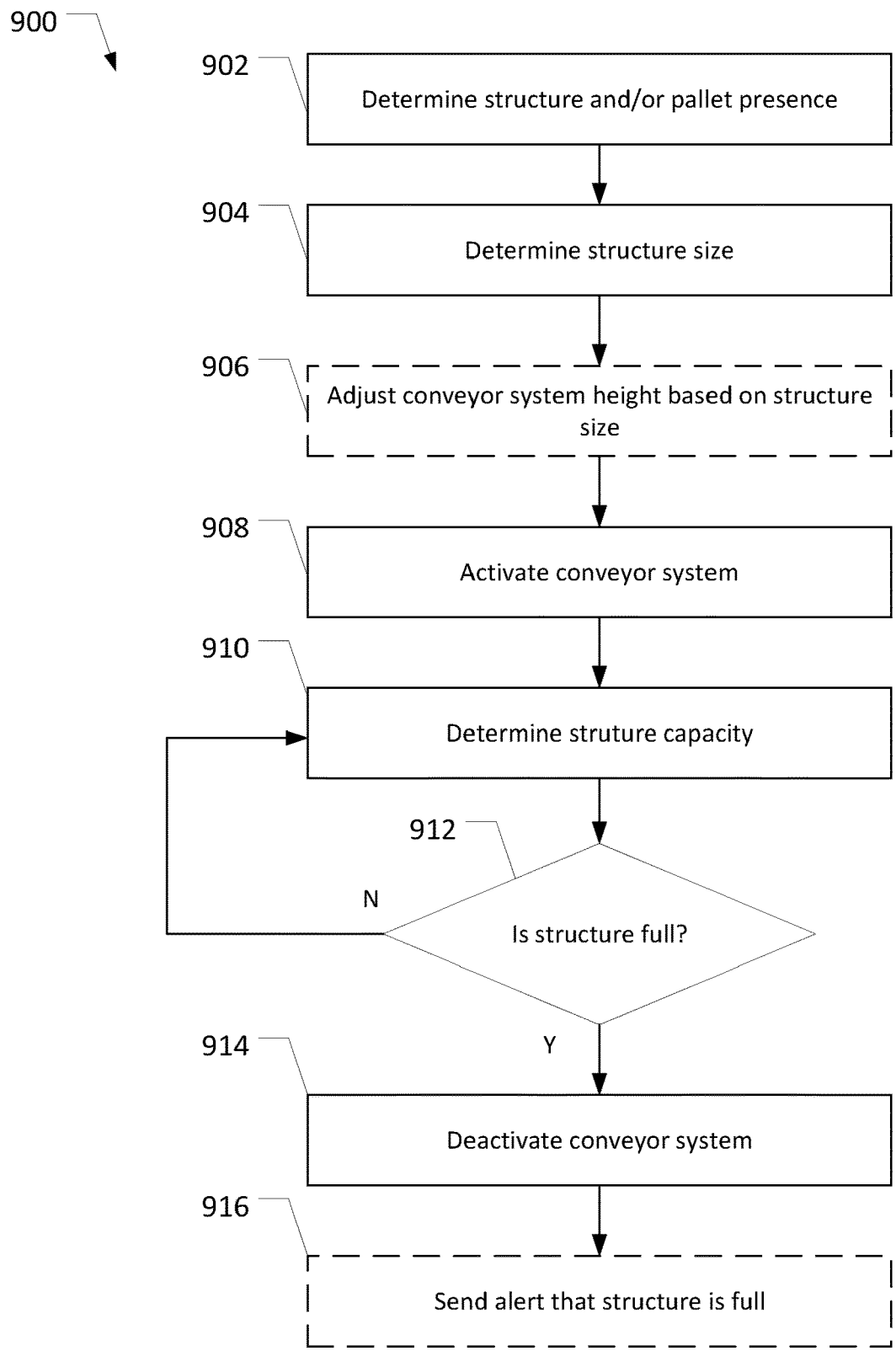
FIG. 9 is a schematic illustration of an example process flow for employing the adjustable system in accordance with one or more exemplary embodiments of the disclosure.

FIG. 9, depicts an example process flow 900 for employing the adjustable system in accordance with one or more exemplary embodiments of the disclosure. To initiate the adjustable system, at block 902 computer-executable instructions stored on a memory of a device, such as a computing device, may be executed to determine a presence of a structure and/or a pallet (e.g., in the structure receiving area of the adjustable system). One or more sensors in the structure receiving area may be in communication with the computing device and may generate a signal indicative of the presence of the structure and/or pallet.

At block 904, computer-executable instructions stored on a memory of a device, such as a computing device, may be executed to determine a size of the structure in the structure receiving area. One or more sensors in the structure receiving area may be in communication with the computing device and may generate a signal indicative of the height or size of the structure and/or type of structure.

At optional block 906, computer-executable instructions stored on a memory of a device, such as a computing device, may be executed to adjust the height of the conveyor system (e.g., at a second end of the conveyor system). It is understood that this step may be automated or manual. At block 908, computer-executable instructions stored on a memory of a device, such as a computing device, may be executed to activate the conveyor system to move items from one end of the conveyor to the other.

At block 910, computer-executable instructions stored on a memory of a device, such as a computing device, may be executed to determine a signal indicative of structure capacity. For example, one or more sensors above the structure receiving area may be in communication with the computing device and may generate a signal indicative of the capacity of the structure. At decision 912, computer-executable instructions stored on a memory of a device, such as a computing device, may be executed to determine if the structure is full or if it has capacity for more items. This may processing a sensor signal indicative of an obstruction in the structure and/or the depth of such obstruction.

If the structure is not full, then block 910 may be reinitiated. If, instead, the structure is full, at block 914 computer-executable instructions stored on a memory of a device, such as a computing device, may be executed to deactivate (e.g., stop) the conveyor system. At optional block 916, computer-executable instructions stored on a memory of a device, such as a computing device, may be executed to send an alert that the structure is full to one or more computing devices or servers.

Illustrative Device Architecture

Figure 10:
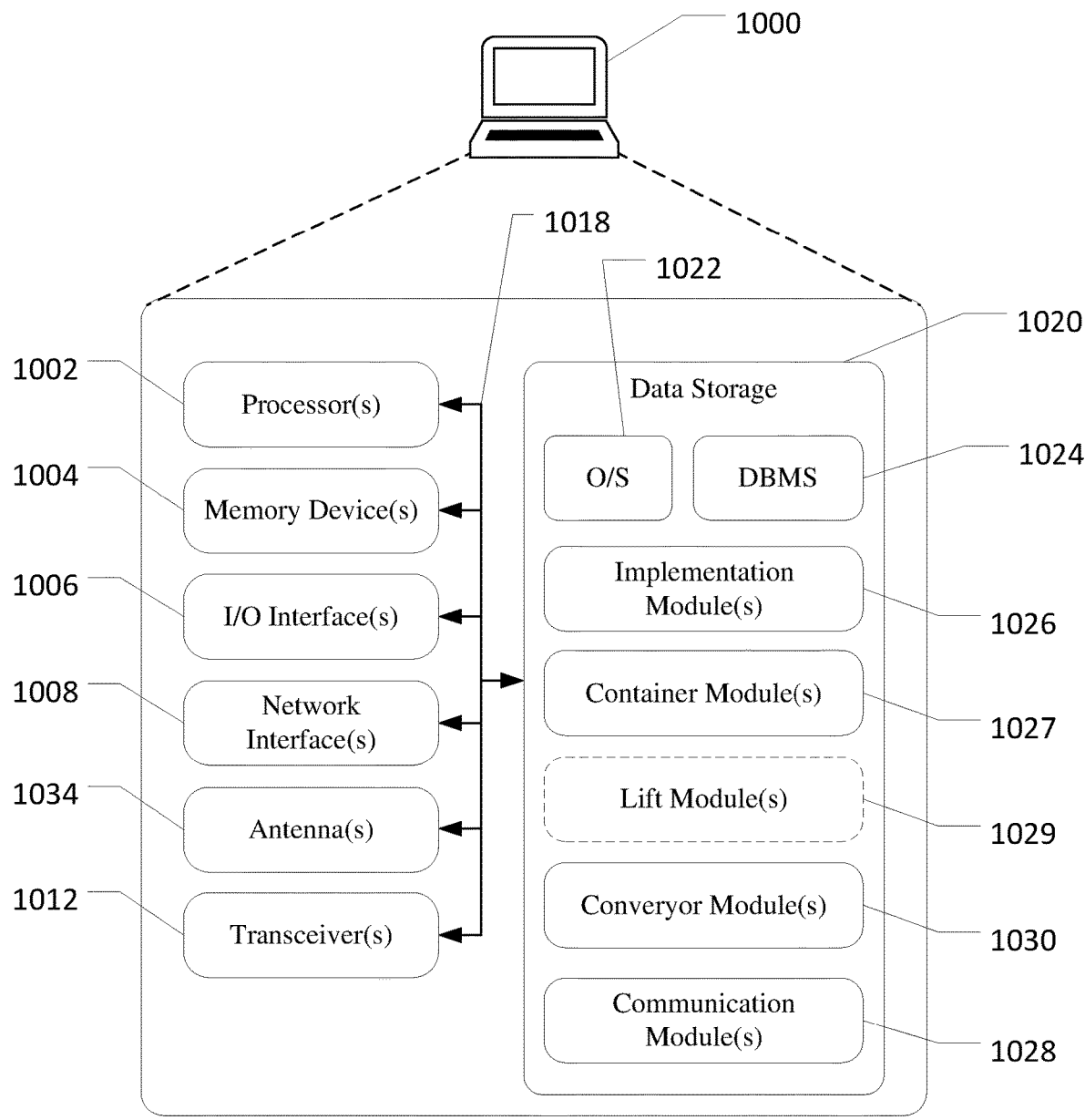
FIG. 10 is a schematic block diagram of a computing device in accordance with one or more exemplary embodiments of the disclosure.

FIG. 10 is a schematic block diagram of an illustrative computing device 1000 in accordance with one or more exemplary embodiments of the disclosure. The computing device 1000 may be any suitable computing device capable of receiving and/or sending data and/or controlling a conveyor system, and may optionally be coupled to devices including, but not limited to, sensors, cameras, controllers, computing devices and/or one or more servers, or the like. The computing device 1000 may correspond to computing device 110 and any other computing device of FIGS. 1-9.

The computing device 1000 may be configured to communicate via one or more networks with one or more servers, camera, controllers, electronic devices, user devices, wearable devices, smart sensors, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1000 may include one or more processors (processor(s)) 1002, one or more memory devices 1004 (generically referred to herein as memory 1004), one or more input/output (I/O) interface(s) 1006, one or more network interface(s) 1008, one or more optional sensors or sensor interface(s), one or more transceivers 1012, one or more optional speakers, one or more optional microphones, and one or more antenna(s) 1034. The computing device 1000 may further include one or more buses 1018 that functionally couple various components of the computing device 1000. The computing device 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the computing device 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more implementation module(s) 1026, one or more container module(s) 1027, one or more communication module(s) 1028, one or more lift module(s) 1029 and/or one or more conveyor module(s) 1030. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the computing device 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, user contact data, device pairing information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the computing device 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1026 may include computer-executable instructions, code, or the like that responsive to execution by one or more of the processor(s) 1002 may perform functions including, but not limited to, overseeing coordination and interaction between one or more modules and computer executable instructions in data storage 1020, determining user selected actions and tasks, determining actions associated with user interactions, determining actions associated with user input, sending and receiving signals and/or data to and from one or more sensors, controllers, other computing devices, servers, datastores and the like, initiating commands locally or at remote computing devices, and the like.

Container module 1026 may include computer-executable instructions, code, or the like that responsive to execution by one or more of the processor(s) 1002 may perform functions including, but not limited to, determining the presence of a structure and/or pallet in the structure receiving area, determining the height or type of structure in the structure receiving area, and/or determining whether a structure in the structure receiving area is at capacity.

The communication module(s) 1028 may include computer-executable instructions, code, or the like that responsive to execution by one or more of the processor(s) 1002 may perform functions including, but not limited to, communicating with one or more cameras, controllers, conveyor belts, conveyor systems, sensors, devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

Optional lift module 1029 may include computer-executable instructions, code, or the like that responsive to execution by one or more of the processor(s) 1002 may perform functions including, but not limited to, determining based on a height of a structure or a height of structure opening, a height that the second end of the conveyor system should be raised or lowered. Optional lift module 1029 may further cause the second end of the conveyor system to raise or lower using a lift system (e.g., pneumatic system).

The conveyor module(s) 1030 may include computer-executable instructions, code, or the like that responsive to execution by one or more of the processor(s) 1002 may perform functions including, but not limited to, controlling one or more conveyor systems (e.g., conveyor belt and/or rollers) to move items from one end of the conveyor system to another end of the conveyor system. Conveyor module 1030 may determine the speed of one or more conveyor belts or rollers. Additionally, the conveyor module 1030 may control the conveyor module based on information from sensors on the conveyor system.

Referring now to other illustrative components depicted as being stored in the data storage 1020, the O/S 1022 may be loaded from the data storage 1020 into the memory 1004 and may provide an interface between other application software executing on the computing device 1000 and hardware resources of the computing device 1000. More specifically, the O/S 1022 may include a set of computer-executable instructions for managing hardware resources of the computing device 1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the computing device 1000 is a mobile electronic device, the DBMS 1024 may be any suitable light-weight DBMS optimized for performance on a mobile device.

Referring now to other illustrative components of the computing device 1000, the optional input/output (I/O) interface(s) 1006 may facilitate the receipt of input information by the computing device 1000 from one or more I/O devices as well as the output of information from the computing device 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(e) 1034 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1000 may further include one or more network interface(s) 1008 via which the computing device 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna(e) 1034 may be communicatively coupled to one or more transceivers 1012 or radio components to which or from which signals may be transmitted or received.

As previously described, the antenna(e) 1034 may include a Bluetooth antenna configured to transmit or receive signals in accordance with established standards and protocols, such as Bluetooth and/or BLE. Alternatively, or in addition to, antenna(e) 1034 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1034 may be configured to transmit or receive radio frequency signals within any suitable frequency range forming part of the unlicensed portion of the radio spectrum (e.g., 900 MHz).

The antenna(e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1034—transmitting or receiving radio frequency (RF) signals in the bandwidth and/or channels corresponding to the communications protocols utilized by the computing device 1000 to communicate with other devices. The transceiver(s) 1012 may include hardware, software, and/or firmware for modulating, transmitting, or receiving—potentially in cooperation with any of antenna(e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computing device 1000. The transceiver(s) 1012 may further include a low noise amplifier (LNA), additional signal amplifiers, an analog-to-digital (A/D) converter, one or more buffers, a digital baseband, or the like.

The optional sensor(s)/sensor interface(s) 1010 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 1010 may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1000 and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the computing device 1000 may include alternate and/or additional hardware, software, or firmware components beyond those described or depicted without departing from the scope of the disclosure. More particularly, it should be appreciated that software, firmware, or hardware components depicted as forming part of the computing device 1000 are merely illustrative and that some components may not be present or additional components may be provided in various embodiments. While various illustrative program module(s) have been depicted and described as software module(s) stored in data storage 1020 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
    a conveyor belt having a first end and a second end;
    a first support structure configured to support the first end of the conveyor belt and coupled to the conveyor belt at a first hinged joint;
    a lift system configured to translate a first rotational force that is applied to a first shaft to a second rotational force that is applied to a second shaft, such that the second shaft extends from a first position to a second position upon application of the first rotational force to the first shaft;
    a first linear guide coupled to the second end of the conveyor belt, the first linear guide configured to engage a third shaft, wherein the first linear guide serves as a prismatic joint such that the third shaft moves along the first linear guide;
    a first platform fixedly coupled to an end of the second shaft, such that the first platform moves from the first position to the second position with the second shaft, the first platform coupled to the third shaft via a revolute joint, the first platform including a sliding portion and a locking portion;
    a second support structure configured to support the second end of the conveyor belt, the second support structure having a second linear guide configured to engage the first platform at the sliding portion and guide the first platform, and a first lock configured to engage the locking portion of the first platform to restrain the first platform from moving; and
    a first proximity sensor disposed on a portion of the second support structure disposed above a loading region, the loading region adjacent the second end of the conveyor belt, the first proximity sensor orientated toward the loading region and configured to generate a signal indicative of a detected obstruction in the loading region,
    wherein the lift system is configured to translate the first rotational force to move the second end of the conveyor belt from a third position to a fourth position while the first end remains stationary.

2. The system of claim 1, wherein the second support structure includes a third linear guide disposed above the second end of the conveyor belt, the system further comprising a first chute configured to engage the third linear guide and move linearly with respect to the third linear guide above the second end of the conveyor belt.

3. The system of claim 1, further comprising a second proximity sensor disposed on the second support structure, the first proximity sensor configured to generate a first signal indicative of a first structure in proximity to the second end of the conveyor belt and the second proximity sensor configured to generate a second signal indicative of a second structure in proximity to the second end of the conveyor belt, the second structure having a different height than the first structure.

4. A system comprising:
    a conveyor system having a first end and a second end;
    a first support structure configured to support the first end of the conveyor system;
    a lift system configured to transition a first shaft from a first position to a second position;
    a first platform coupled to an end of the first shaft;
    a second shaft coupled to the first platform;
    a first guide coupled to the second end of the conveyor system and configured to engage the second shaft to linearly guide the second shaft; and
    a second support structure comprising (i) a second guide that is configured to engage the first platform, and (ii) a first restraint configured to restrain the first platform with respect to the second support structure.

5. The system of claim 4, wherein the second support structure further comprises a third linear guide disposed above the second end of the conveyor system, the system further comprising:
    a first chute configured to engage the third guide and to move linearly with respect to the third guide.

6. The system of claim 4, further comprising a first sensor disposed on a portion of the second support structure above a loading region, the loading region adjacent the second end of the conveyor system, the first sensor orientated toward the loading region and configured to generate a signal indicative of a detected obstruction in the loading region.

7. The system of claim 4, further comprising a first sensor and a second sensor disposed on the second support structure, the first sensor configured to generate a first signal indicative of a first structure in proximity to the second end of the conveyor system and the second sensor configured to generate a second signal indicative of a second structure in proximity to the second end of the conveyor system.

8. The system of claim 4, further comprising a lip disposed at the second end of the conveyor system and configured to transition from a first lip position configured to permit items on the conveyor system to exit the conveyor system, and a second lip position configured to obstruct items on the conveyor system from exiting the conveyor system.

9. The system of claim 4, wherein the lift system further includes a third shaft and is configured to translate a first rotational force applied to the third shaft to a second rotational force applied to the first shaft, such that the first shaft transitions from the first position to the second position, wherein the second position is relatively higher than the first position.

10. The system of claim 4, wherein the lift system is a pneumatic air controlled system.

11. The system of claim 4, further comprising a structure restraint coupled to the second support structure and configured to secure a structure positioned at the second end of the conveyor system to the second support structure.

12. The system of claim 4, wherein the conveyor system is coupled to the first support structure with one degree of freedom and the second shaft is coupled to the first platform with one degree of freedom.

13. A system comprising:
a conveyor system having a first end and a second end;
a first support structure configured to support the first end of the conveyor system and;
a first platform;
a lift system including a first pulley and a cable coupled to the conveyor system at one end of the cable and engaged with the first pulley, the lift system configured to transition the first platform from a first position to a second position;
a first shaft coupled to the first platform;
a first guide coupled to the second end of the conveyor system and configured to engage the first shaft to linearly guide the first shaft; and
a second support structure including a second guide configured to engage the first platform to linearly guide the first platform.

14. The system of claim 13, wherein the second support structure includes a third linear guide disposed above the second end of the conveyor system, the system further comprising:
a first chute configured to engage the third guide and move linearly with respect to the third guide.

15. The system of claim 13, further comprising a first sensor disposed on a portion the second support structure above a loading region, the loading region adjacent the second end of the conveyor system, the first sensor orientated toward the loading region and configured to generate a signal indicative of a detected obstruction in the loading region.

16. The system of claim 13, further comprising a first sensor and a second sensor disposed on the second support structure, the first sensor configured to generate a first signal indicative of a first structure in proximity to the second end of the conveyor system and the second sensor configured to generate a second signal indicative of a second structure in proximity to the second end of the conveyor system, the first structure having a height different than the second structure.

17. The system of claim 13, further comprising a lip disposed at the second end of the conveyor system and configured to transition from a first lip position configured to permit items on the conveyor system to exit the conveyor system and a second lip position configured to obstruct items on the conveyor system from exiting the conveyor system.

18. The system of claim 13, wherein the lift system is configured to apply a first force to the conveyor system to cause the second end of the conveyor system to move upward with respect to the first end of the conveyor system.

19. The system of claim 13, further comprising a structure restraint coupled to the second support structure and configured to secure a structure positioned at the second end of the conveyor system to the second support structure.

* * * * *